(12) United States Patent
Ogura (10) Patent No.: US 6,343,099 B1
(45) Date of Patent: Jan. 29, 2002

(54) ADAPTIVE MOTION VECTOR DETECTING APPARATUS AND METHOD

(75) Inventor: Eiji Ogura, Saitama (JP)

(73) Assignee: Sony Corporation, Tokyo (JP)

( * ) Notice: Subject to any disclaimer, the term of this patent is extended or adjusted under 35 U.S.C. 154(b) by 790 days.

(21) Appl. No.: 08/634,203

(22) Filed: Apr. 18, 1996

(30) Foreign Application Priority Data

Apr. 20, 1995 (JP) ............................................. 7-119116

(51) Int. Cl.[7] ................................................. H04N 7/12
(52) U.S. Cl. ................................. 375/240.16; 348/699
(58) Field of Search ................................. 348/699, 416, 348/415, 402, 390, 407, 413; 375/240.16, 240.17; 382/238, 231; 358/261.2, 430

(56) References Cited

U.S. PATENT DOCUMENTS

| | | | | |
|---|---|---|---|---|
| 5,475,446 A | * | 12/1995 | Yamada et al. ............. 348/699 |
| 5,477,272 A | * | 12/1995 | Zhang et al. ................ 348/407 |
| 5,515,114 A | * | 5/1996 | Murata ........................ 348/699 |
| 5,587,741 A | * | 12/1996 | Kim ............................. 348/416 |
| 5,612,751 A | * | 3/1997 | Kondo ........................ 348/699 |

* cited by examiner

*Primary Examiner*—Vu Le
(74) *Attorney, Agent, or Firm*—Frommer Lawrence & Haug LLP; William S. Frommer (57) ABSTRACT

An adaptive motion vector detector adaptively selects the pixels employed in detecting motion vectors between a first frame and a second frame of a video broadcast. The first frame includes a reference block of pixels and the second frame includes a check block of pixels. An analyzing circuit adaptively determines positions of a first subset of pixel values in the reference block based on a variable feature of the reference block. A selecting circuit samples the first subset of pixel values in the reference block and a second subset of pixel values in the check block at the positions determined by the analyzing circuit.

36 Claims, 8 Drawing Sheets

| (17) | 32 | 57 | 97 | 93 | 131 | 220 | (227) | 214 | 191 | 147 | 116 | 118 | 113 | 109 | 120 |
|---|---|---|---|---|---|---|---|---|---|---|---|---|---|---|---|
| 19 | 42 | 67 | 55 | 72 | 75 | 87 | 195 | (237) | 233 | 221 | 162 | 131 | 131 | 117 | 117 |
| 21 | 52 | 83 | 89 | 87 | 78 | 109 | 152 | 152 | 147 | 113 | 99 | 129 | 127 | 133 | 136 |
| 20 | 55 | 104 | 125 | 103 | 103 | 89 | 67 | 97 | 107 | 118 | 85 | (64) | 102 | 111 | 112 |
| 19 | 51 | 100 | 124 | 92 | 62 | 82 | 103 | 118 | 125 | 110 | 86 | 98 | 116 | 106 | 100 |
| (17) | 45 | 95 | 133 | (147) | 118 | 68 | 51 | 87 | 115 | 124 | 113 | 89 | 101 | 129 | 125 |
| 20 | 35 | 61 | 110 | 122 | 105 | 54 | 45 | 96 | 111 | 109 | 93 | 86 | 111 | (152) | 149 |
| 17 | 37 | 49 | 57 | 57 | 77 | 95 | 82 | (67) | 92 | 125 | 129 | 117 | 97 | 83 | 110 |
| (17) | 29 | 45 | 62 | 75 | 80 | 77 | 66 | 63 | 73 | 103 | 125 | 121 | 101 | 98 | (136) |
| 20 | 29 | 39 | 48 | 62 | 83 | 82 | 78 | 65 | 61 | 64 | 60 | 63 | 80 | 89 | 93 |
| 22 | 42 | 41 | 42 | 62 | 78 | 81 | 80 | 81 | 85 | 78 | 66 | 57 | 56 | 67 | (52) |
| 23 | 57 | (121) | 105 | 45 | 45 | 55 | 73 | 76 | 80 | 89 | 86 | 80 | 70 | 73 | 66 |
| 22 | 61 | 120 | 159 | 133 | 69 | 32 | 37 | 46 | 69 | 80 | 77 | 79 | 73 | 84 | 80 |
| 20 | 59 | 115 | 166 | 204 | 187 | 124 | 51 | 22 | 31 | 41 | 50 | 69 | 57 | 52 | 72 |
| (18) | 43 | 107 | 157 | 206 | (211) | 148 | 117 | 102 | 83 | 79 | 40 | (16) | 40 | 56 | 49 |
| 18 | 35 | 56 | 85 | 172 | 205 | 171 | 164 | (167) | 162 | 124 | 100 | 71 | 70 | 101 | 88 |

Fig. 7B

| 1 | 0 | 0 | 0 | 0 | 0 | 0 | 1 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 |
| 1 | 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 1 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 1 |
| 0 | 0 | 1 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 1 | 0 | 0 | 0 | 1 | 0 | 0 | 0 | 0 | 0 | 0 | 1 | 0 | 0 | 0 | 0 |
| 0 | 0 | 0 | 0 | 0 | 0 | 0 | 0 | 1 | 0 | 0 | 0 | 0 | 0 | 0 | 0 |

ADAPTIVE MOTION VECTOR DETECTING APPARATUS AND METHOD

BACKGROUND OF THE INVENTION

The present invention relates to motion vector detecting and, more particularly, to adaptive motion vector detecting.

Motion vector detecting is employed in an MPEG system, which was developed in accordance with standards established by the Motion Picture Experts Group (MPEG). The MPEG system provides encoding and decoding of a high-definition television broadcast which minimizes the amount of transmitted data. Motion vectors designate the direction and magnitude of change of an image block comprising part of an individual frame in the television broadcast. By defining all image blocks of the frame in terms of motion vectors instead of individual pixels, the MPEG system can reduce the amount of data required to be broadcast. Such a system is known as interframe predictive encoding system because the motion vectors are employed to determine differences between different frames.

Figure 8:
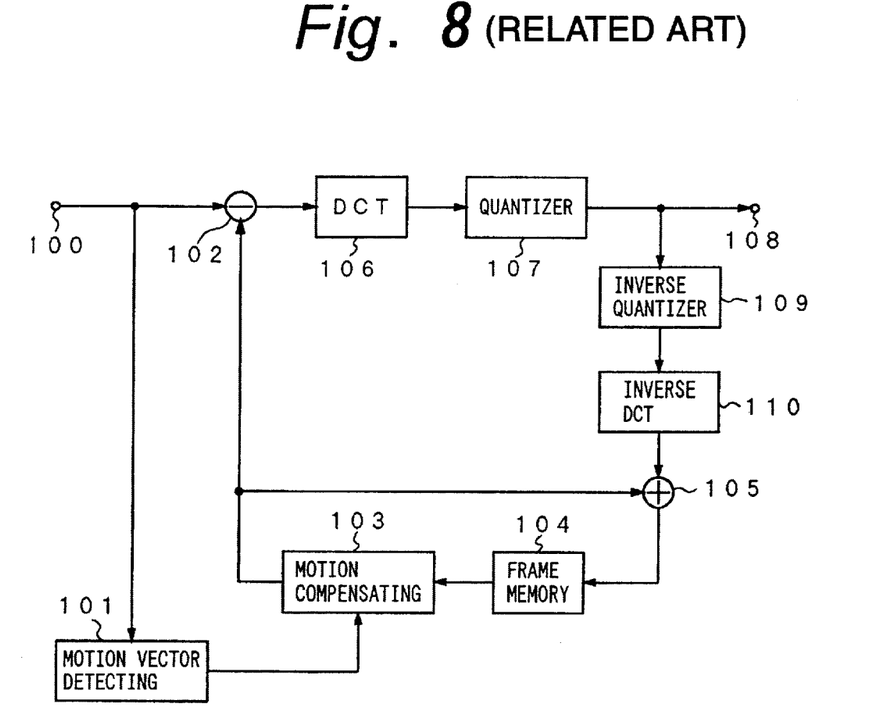
FIG. 8 is a block diagram of an MPEG system.

As shown in FIG. 8, a predictive encoding apparatus receives a current frame of a television picture at input 100. The current frame is forwarded to both a motion vector detecting circuit 101 and a subtractor 102. The motion vector detecting circuit extracts the motion vectors from the current frame and supplies them to the motion compensating circuit 103. The motion compensating circuit, then, performs motion compensation on the previous frame stored in the frame memory 104 to obtain a motion compensated reference frame. The subtractor, then, subtracts the current frame from the reference frame to obtain difference data. The difference data is compressed by a discrete cosine transform (DCT) circuit 106, quantized by the quantizer 107, and forwarded for broadcast from output 108.

The predictive encoding apparatus transforms the current frame into the previous frame stored in the frame memory by performing the above-described steps in reverse and storing the result in the frame memory 104. Thus, the quantized difference data is decoded by an inverse quantizer 109 and an inverse DCT circuit 110. The adder 105 adds the decoded difference data to the reference frame generated by the motion compensating circuit, thus, regenerating the current frame. The current frame is, then, stored in the frame memory and becomes the previous frame when the subsequent frame is received at input 100. In this manner, each of the frames comprising the television broadcast are predictively encoded and forwarded for broadcast through output 108.

A problem exists, however, that the motion vector detecting circuit 101 may generate an erroneous motion vector. Normally, the motion vector detecting circuit generates a motion vector employing a fixed block matching method. A check block is moved within a predetermined vector search range and a block that is most matched with a reference block of the current frame is detected. The motion vector is calculated by comparing the reference block to the matched block and this motion vector then is forwarded to the motion compensating circuit 103. An erroneous motion vector is generated when the check block may be matched to the wrong reference block.

Figure 9:
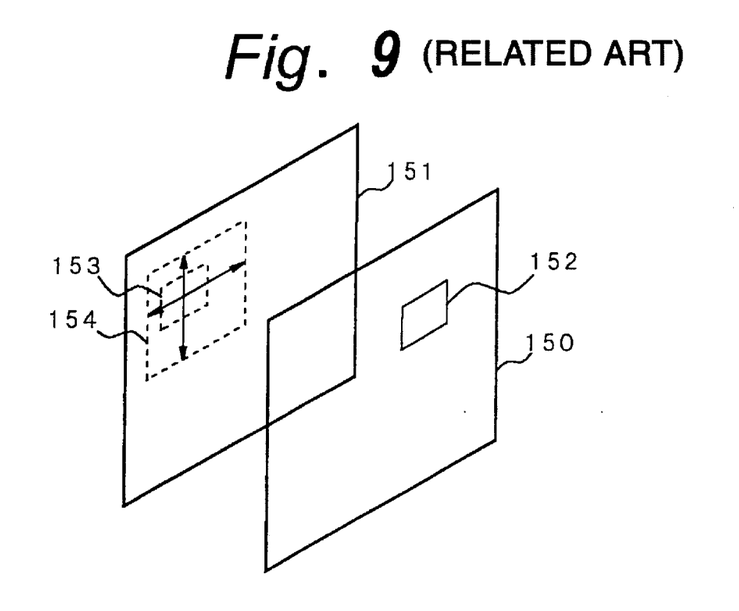
FIG. 9 is a schematic diagram for explaining the block matching method.

A better understanding of the problem can be ascertained by way of an example explained with reference to FIGS. 9, 10 and 11A to 11C. In FIG. 9, the reference block 152 of M×N pixels is disposed within the reference frame 150. A search frame 151 (i.e., subsequent frame) is received and the motion vector detecting circuit begins the block matching method. A border 153 is "moved" within a vector search range, the pixels within the border at each position making up the check block. Thus, the check block 153 of M×N pixels is "moved" within the vector search range 154 until a satisfactory match between the check block 153 and the reference block 152 is determined. The motion vector detecting circuit, then, executes an arithmetic operation on the basis of the differences between the matched check block and the reference block to obtain a motion vector. The motion vector has a magnitude (hereinafter referred to as the residual difference) which is the mathematical absolute value sum of the minimum difference between the pixel values at the same position in both the reference block and the check block. In the alternative, the residual difference may be calculated as a square sum of the differences of the pixel values. A unit direction of the motion vector is also generated by the motion vector detecting circuit, thus complementing the residual difference value.

Figure 10:
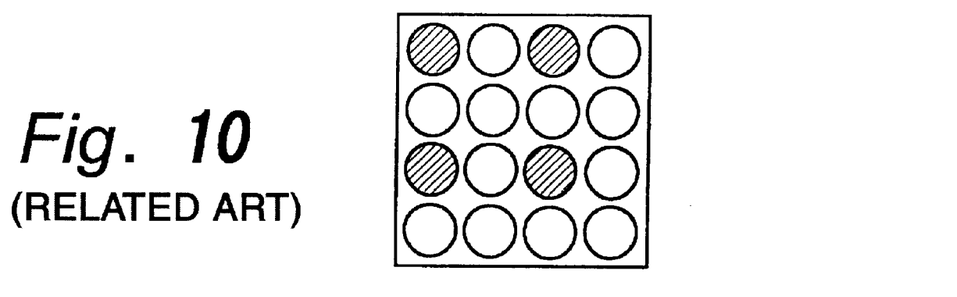
FIG. 10 is a representation of pixels in a 4×4 reference block.
Figure 11A:
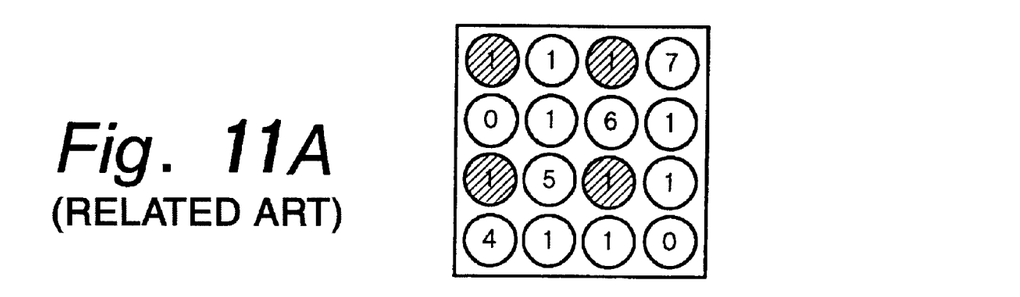
FIG. 11A is a representation of pixels in a reference block and FIGS. 11B and 11C are representations of pixels in check blocks.
Figure 11B:
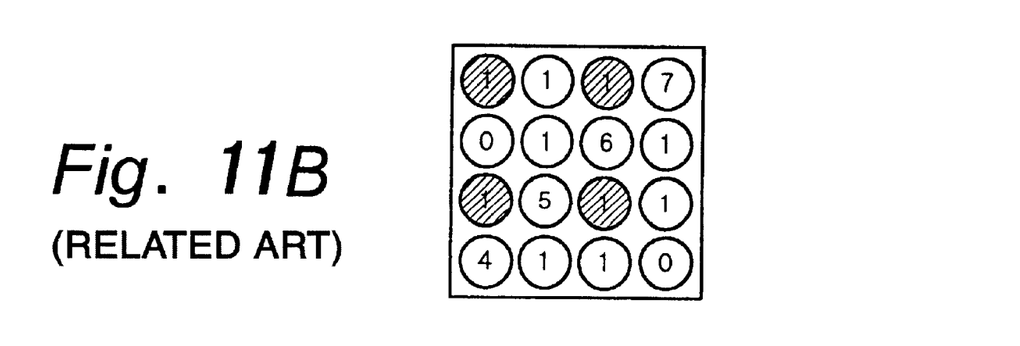

The block matching method will be explained in detail with reference to FIGS. 10 and 11A to 11C. To reduce the burden on the arithmetic processor, the motion vector detector performs subsampling of the reference block and the check block. FIG. 10, for example, depicts sampling the four hatched pixels of a 4×4 block (i.e., sixteen pixel block), thus performing fixed sampling at a 4:1 ratio. The reference block of FIG. 11A and the check block of FIG. 11B are sampled in the same manner as the block in FIG. 10. Then, the check block is moved within the vector search range (FIG. 9) until the four sampled pixels of the check block match the four pixels in the reference frame. This block matching method works well only when the reference block is significantly similar to the search area making up the check block as shown in FIGS. 11A and 11B.

Figure 11C:
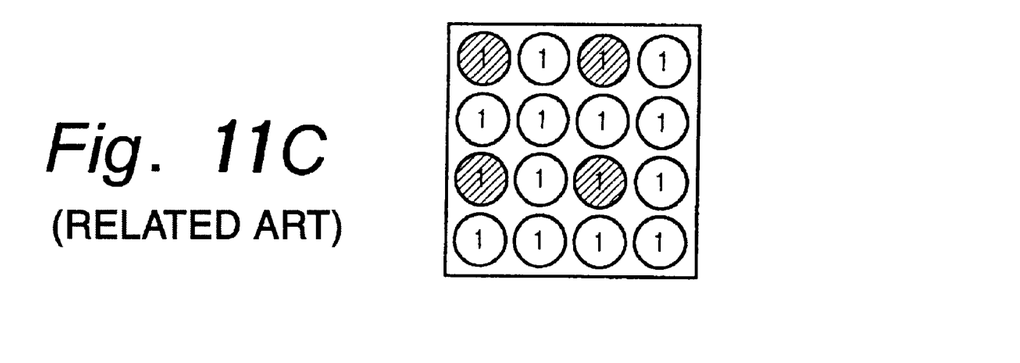

However, when the search block making up the check block has a very different pattern as, for example, shown by FIG. 11C, the motion vector detector may erroneously match the wrong block of the search area to the reference block. Since all of the pixels have a value of "1" in the example of FIG. 11C, the check block will be matched to the reference block in any number of different positions in the search area. Thus, the motion vector detecting circuit 101 may generate an erroneous motion vector, resulting in a distorted television broadcast.

OBJECTS OF THE INVENTION

An object of the invention, therefore, is to eliminate a mismatch between the check block and the reference block. A further object of the invention is to increase the signal-to-noise ratio of the television broadcast.

An even further object of the invention is to provide an apparatus and method for adaptively detecting motion vectors.

SUMMARY OF THE INVENTION

In accordance with the above objectives, a first embodiment of the present invention provides an adaptive motion vector detecting apparatus and method for adaptively selecting pixels employed in detecting motion vectors between a first frame and a second frame of a video broadcast. The first frame includes a reference block of pixels and the second frame includes a check block of pixels. An analyzing circuit adaptively determines positions of a first subset of pixel values in the reference block from a variable feature of the reference block. A selecting circuit samples the first subset of pixel values in the reference block and a second subset of pixel values in the check block at the positions determined by the analyzing circuit.

In a second embodiment, a dividing circuit divides the reference and check blocks into sets of sub reference blocks and sub check blocks. An analyzing circuit adaptively determines a set of positions of a first subset of pixel values for each sub reference block, each set of positions being determined from a variable feature in each sub reference block. A selecting circuit samples a respective sub reference block and one of the sub check blocks at the set of positions determined for the respective sub reference block.

BRIEF DESCRIPTION OF THE DRAWINGS

A more complete appreciation of the present invention and many of its attendant advantages will be readily obtained by reference to the following detailed description considered in connection with the accompanying drawings, in which:

FIGS. 7A and 7B are representations of pixels in a 16×16 reference block sampled according to the second embodiment;

DETAILED DESCRIPTION OF THE PREFERRED EMBODIMENTS

Referring now to the drawings, wherein like reference numerals designate identical or corresponding parts throughout, the present invention now will be described.

FIRST EMBODIMENT

Figure 1:
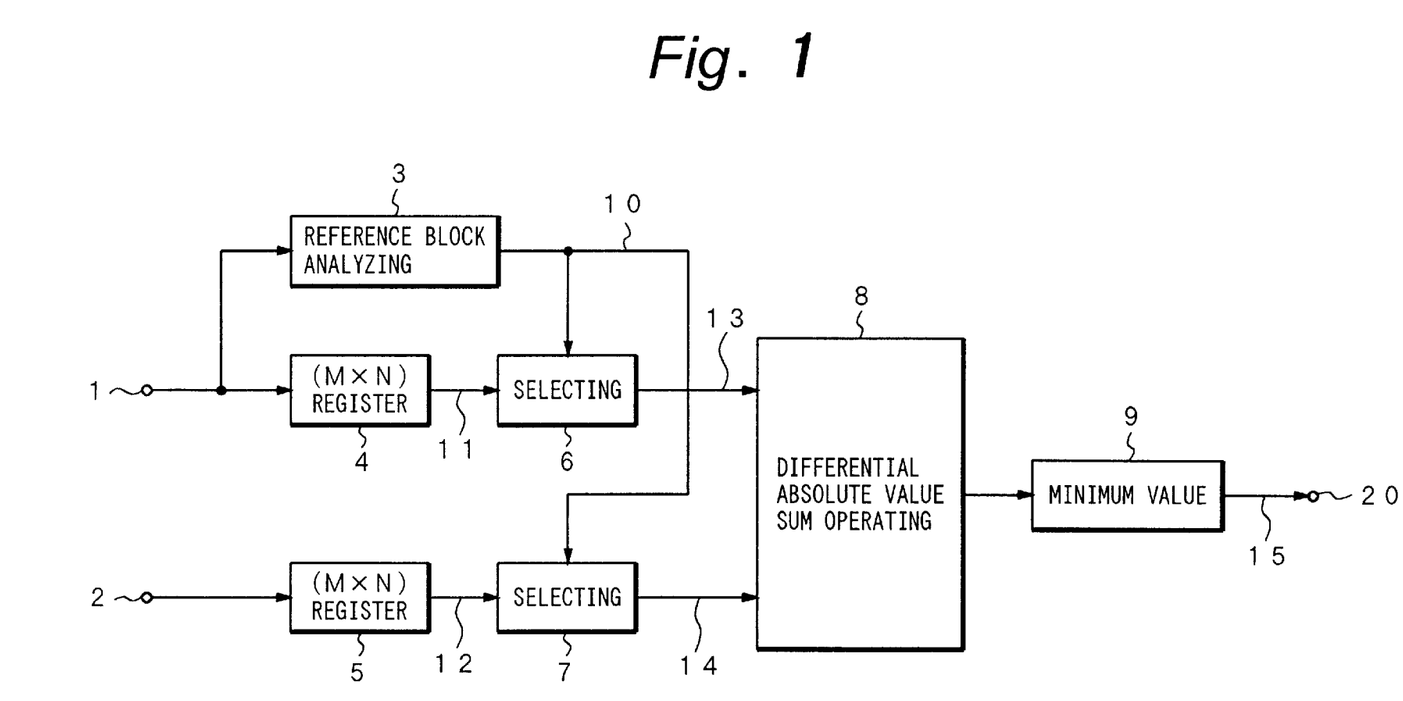
FIG. 1 is a block diagram of the adaptive motion vector detecting apparatus according to a first embodiment of the present invention.

The first embodiment of the invention will be described with reference to the motion vector detecting circuits of FIGS. 1 and 2. In FIG. 1, the motion vector detecting circuit receives reference and check block data from input terminals 1 and 2, respectively. The blocks are stored by registers 4 and 5. A reference block analyzing circuit 3 commands selecting circuits 6 and 7 to adaptively select pixels of each block. The selected pixels are forwarded to a differential absolute value sum operating circuit 8 which calculates the residual difference. A minimum value circuit 9 selects the minimum residual difference because the correct check block should have a minimum difference between successive frames and the correct residual difference is output.

The adaptive selection operation of the motion vector detecting circuit will now be described in more detail. The reference block data is supplied to the input 1 and forwarded to both the reference block analyzing circuit and the (M×N) register 4. The check block data is similarly supplied to the input 2 and forwarded to the (M×N) register 5. The (M×N) registers 4 and 5 store the reference block and check block data, respectively. The reference block analyzing circuit causes the selecting circuits 6 and 7 to adaptively select pixels from each of the (M×N) registers by outputting a selection signal 10 indicating the positions of the pixels to be selected. The reference block analyzing circuit determines which pixels are to be selected by calculating a value indicative of a particular feature of the reference block. That is, the pixels are adaptively selected based on that particular feature of the reference block.

For example, the feature used to adaptively select pixels may be the maximum and minimum values of the pixels in the reference block data. The reference block analyzing circuit determines the positions of the pixels which have the maximum and minimum values and generates the selection signal indicative of the positions. Preferably, two maximum and two minimum values are used to ensure greater accuracy in matching the check block to the reference block.

The feature can also be the maximum and minimum deviations from the mean value in the reference block. That is, the reference block analyzing circuit calculates the mean (i.e., average) value for all the pixel values in the reference block and the pixel values having the maximum and minimum deviations from the mean value are selected.

The above features can also be combined to yield a first set of maximum/minimum values and a second set of mean deviation values. Thus, the reference block analyzing circuit determines the maximum and minimum pixel values, and also determines the mean deviation pixel values.

As an alternative to the above features, the reference block analyzing circuit can also select pixels on the basis of the difference between adjacent pixels. The maximum and minimum differences between the adjacent pixels determines which pixels are selected.

The reference block analyzing circuit, thus, generates a selection signal 10 dependent upon the pixels selected under one of the discussed feature schemes. The selection signal is supplied to both selecting circuits 6 and 7 and the selecting circuits select the pixels from the (M×N) registers 4 and 5. In this manner, the reference block and the check block are subsampled adaptively and an erroneous mismatching is avoided.

The selected pixel values are supplied to the differential absolute value sum operating circuit 8 as reference block data 13 and check block data 14. The differential absolute value sum operating circuit calculates the absolute residual difference between the selected reference block selected pixels and the selected check block selected pixels. For example, the absolute difference between the maximum pixel values in the check block and the reference block is added to the absolute difference between the minimum pixel values in the check block and the reference block. In the alternative, the differential absolute value sum operating circuit 8 may calculate the square sum of the differences between the pixel values.

Due to the subsampling, the dimensions of the selected reference block or check block are necessarily smaller than the (M×N) blocks received at the inputs 1 and 2. Therefore, the arithmetic burden on the differential absolute value sum operating circuit is reduced and operation speed is increased.

As discussed, the correct check block will have the minimum residual difference. Thug, the minimum value circuit 9 selects the minimum residual difference to ensure that the correct motion vector is detected.

Figure 2:
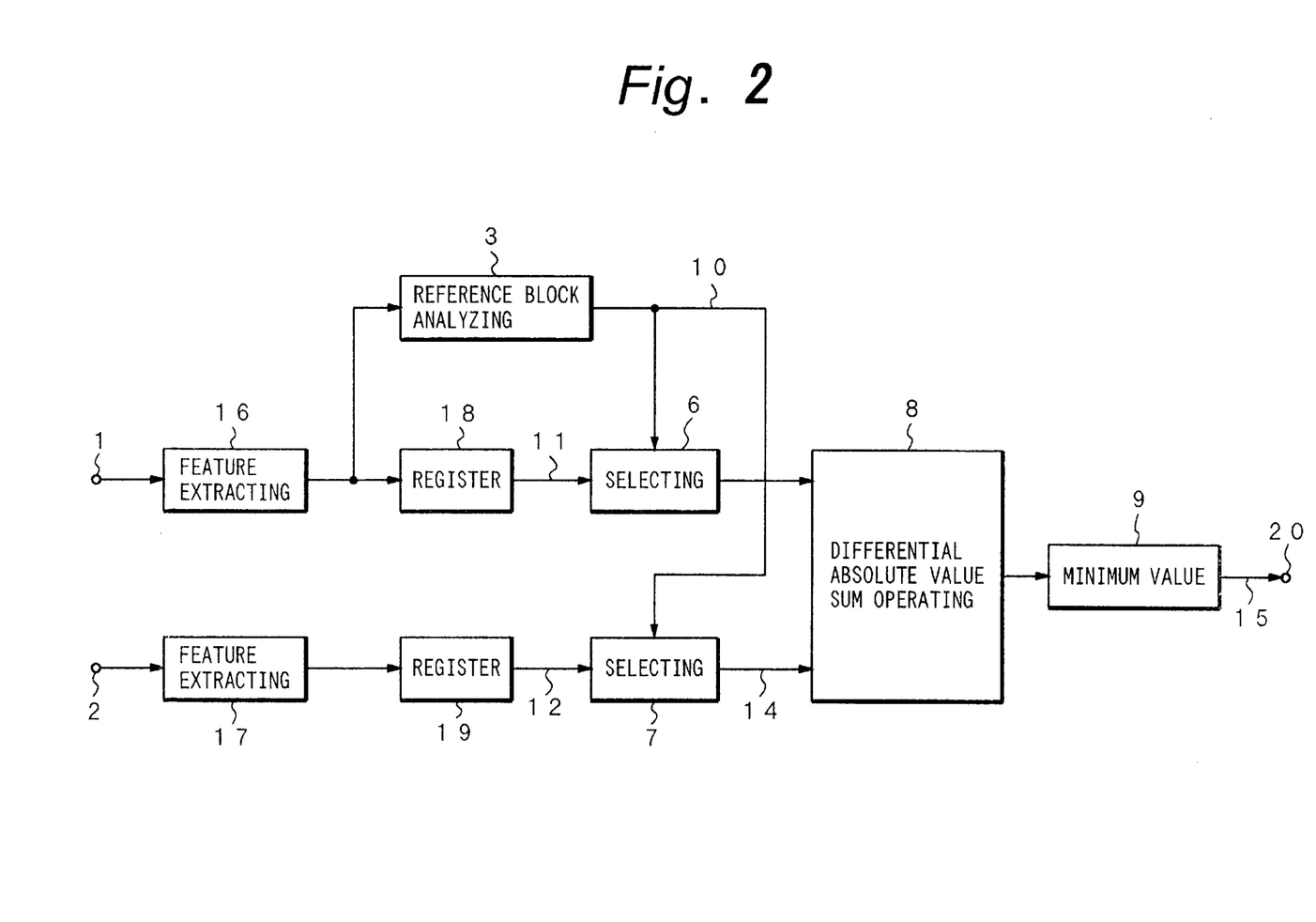
FIG. 2 is a block diagram of the adaptive motion vector detecting apparatus according to a modification of the first embodiment.

FIG. 2 is a block diagram of a modification to the first embodiment. The figures are generally the same except that FIG. 2 is modified to include feature extracting circuits 16 and 17 coupled to the inputs 1 and 2, respectively. The purpose of the feature extracting circuits is to extract feature values (other than the feature described in regard to FIG. 1) from the reference and check blocks at the inputs, thus reducing the size of the blocks input to the motion vector detecting circuit. Since the size of the input blocks is reduced, the overall processing becomes easier and system efficiency is increased.

As an example of extracting the pixels having the desired feature by the feature extracting circuit, a low pass filter may be employed. In the alternative, the feature extracting circuits may divide the reference and check blocks into smaller blocks and add the pixel values in each of the smaller blocks. An integration projection which adds the pixel values in the lateral and vertical direction (such as a Hadamard transformation) may also be employed by the feature extracting circuits.

The reference block and the check block are processed in the same manner described with reference to FIG. 1. A detailed discussion of the operation of the corresponding circuits will, therefore, not be repeated and reference is made to the foregoing description.

SECOND EMBODIMENT

Figure 3:
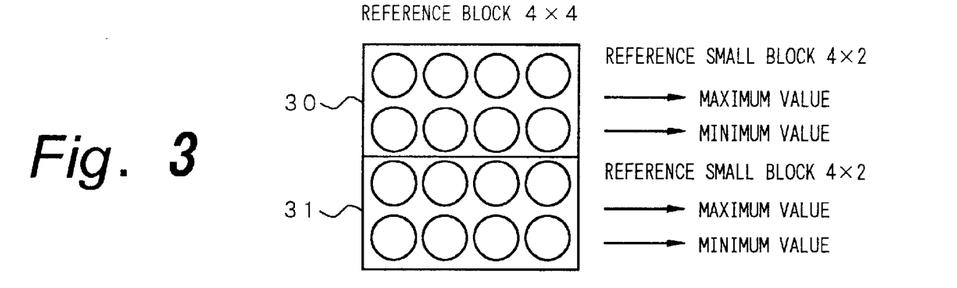
FIG. 3 is a representation of pixels in a 4×4 reference block according to a second embodiment of the present invention.

The second embodiment will now be described with reference to FIGS. 3, 4A to 4C, 6, 7A and 7B. FIG. 3 is a representation of pixels in a 4×4 block. According to the second embodiment, adaptive sampling is achieved by dividing the blocks into sub blocks 30 and 31 (here, two 4×2 sub blocks) and determining the maximum and minimum pixel values for each sub block.

Figure 4A:
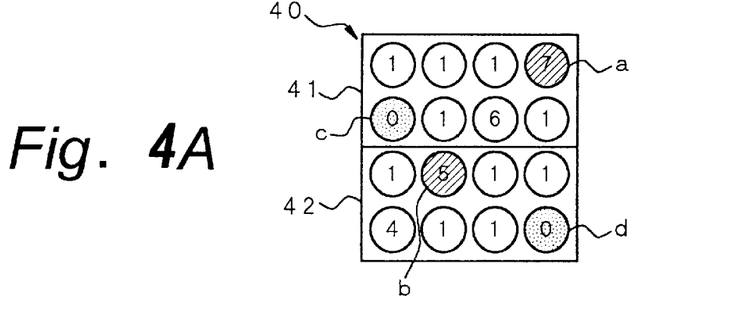
FIG. 4A is a representation of pixels in a reference block and FIGS. 4B and 4C are representations of pixels in check blocks according to the second embodiment.
Figure 4B:
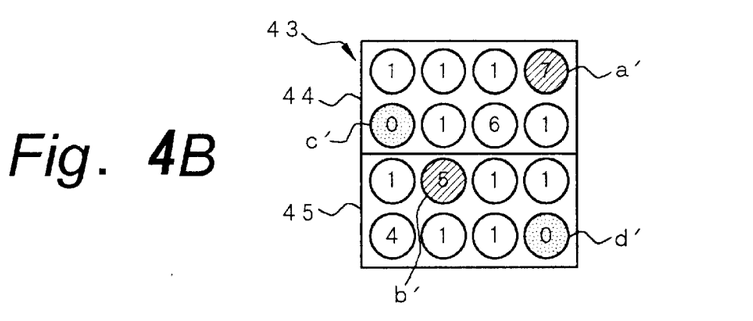

FIG. 4A, for example, shows the reference block 40 divided into two 4×2 sub blocks 41 and 42. The extracted maximum pixel values (a and b) in each sub block are shown by the hatched circles while the extracted minimum values in each sub block are indicated by the dotted circles (c and d). Similarly, the check block 43 of FIG. 4B is divided into two sub blocks 44 and 45 and the extracted maximum and minimum values are indicated by the circles (a', b', c' and d'). The extracted values are sent to a differential absolute value sum operating circuit 61 (FIG. 6) and the residual difference is calculated therefrom. In the situation where the residual difference is calculated as the absolute value of the differences between corresponding maximum and minimum values, the following mathematical expression yields the residual difference value.

$$\text{Residual Difference} = |a-a'| + |b-b'| + |c-c'| + |d-d'| \qquad (1)$$

In the above example, the check block 43 is identical to the reference block 40. Accordingly, the residual difference is=0 and the blocks are considered to be matched perfectly.

Figure 4C:
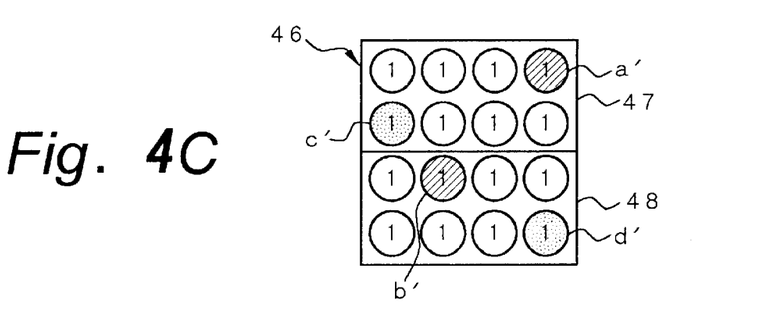

However, in the case where the check block of FIG. 4C is significantly different from the reference block of FIG. 4A, the residual difference is 12; and it will be seen that the fixed sampling block matching method generates erroneous matches. In the present invention, on the other hand, the adaptive sampling described above is employed and the check block is correctly matched to the reference block despite the significant differences in pixel values. The feature extracted from both the reference and check blocks 40 and 46, respectively, are the pixels corresponding to the maximum and minimum values of the reference sub blocks (a, a', b, b', c, c', d and d'). As the check block is moved within the vector range (FIG. 9), pixels in the check block at the positions corresponding to the maximum and minimum pixel values in the reference sub blocks are selected from the check sub blocks. The check block with a minimum residual difference, as determined by a minimum value circuit 62 (FIG. 6), is determined to be the correct check block. Thus, errors are not produced in the present invention when the check block pattern is significantly different from the reference block pattern. Rather, the present invention obtains the correct match.

Figure 5:
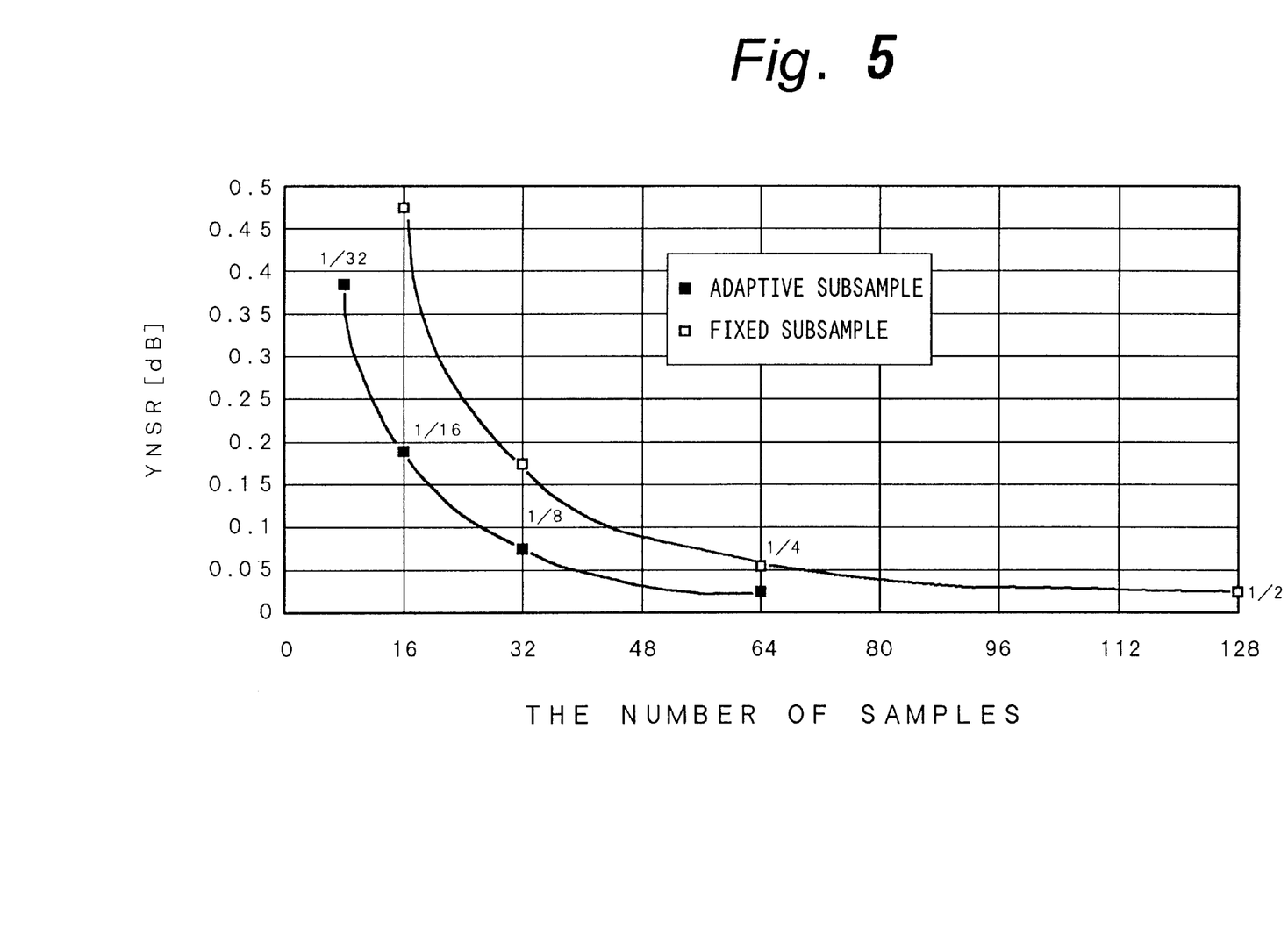
FIG. 5 is a graph depicting the signal-to-noise ratio for various samples of both adaptive and fixed subsampling.

Experimental results of the present invention according to the second embodiment are depicted in the graph of FIG. 5. The Y-axis (ordinate) represents the noise-to-signal ratio (YNSR) in decibels (dB) of a motion vector detecting circuit and the X-axis (abscissa) represents the number of samples per reference block. The fixed sampling block matching method is depicted by the curve comprised of hollow squares, and the adaptive sampling method according to the present invention is depicted by the curve comprised of solid squares. The experimental results were derived under the conditions of an MPEG encoding rate of 6 MBps with a reference block size of 16×16 pixels. The signal-to-noise ratio was calculated using the following expression.

$$SNR = -20 \text{Log} \left( \sqrt{\frac{\sum (Yreal - Ydecode)^2}{\text{the number of all pixels}}} \Big/ 255 \right) \qquad (2)$$

As can be seen from the graph, the adaptive sampling method of the present invention has a lower noise-to-signal ratio for the same number of samples than the fixed sampling method. It will also be noted that the number of samples can be increased in the present invention to 32 pixels since the signal-to-noise ratio is high, thus allowing the MPEG system to increase television pixel density. Thus, the present invention is clearly advantageous over a fixed sampling method.

Figure 6:
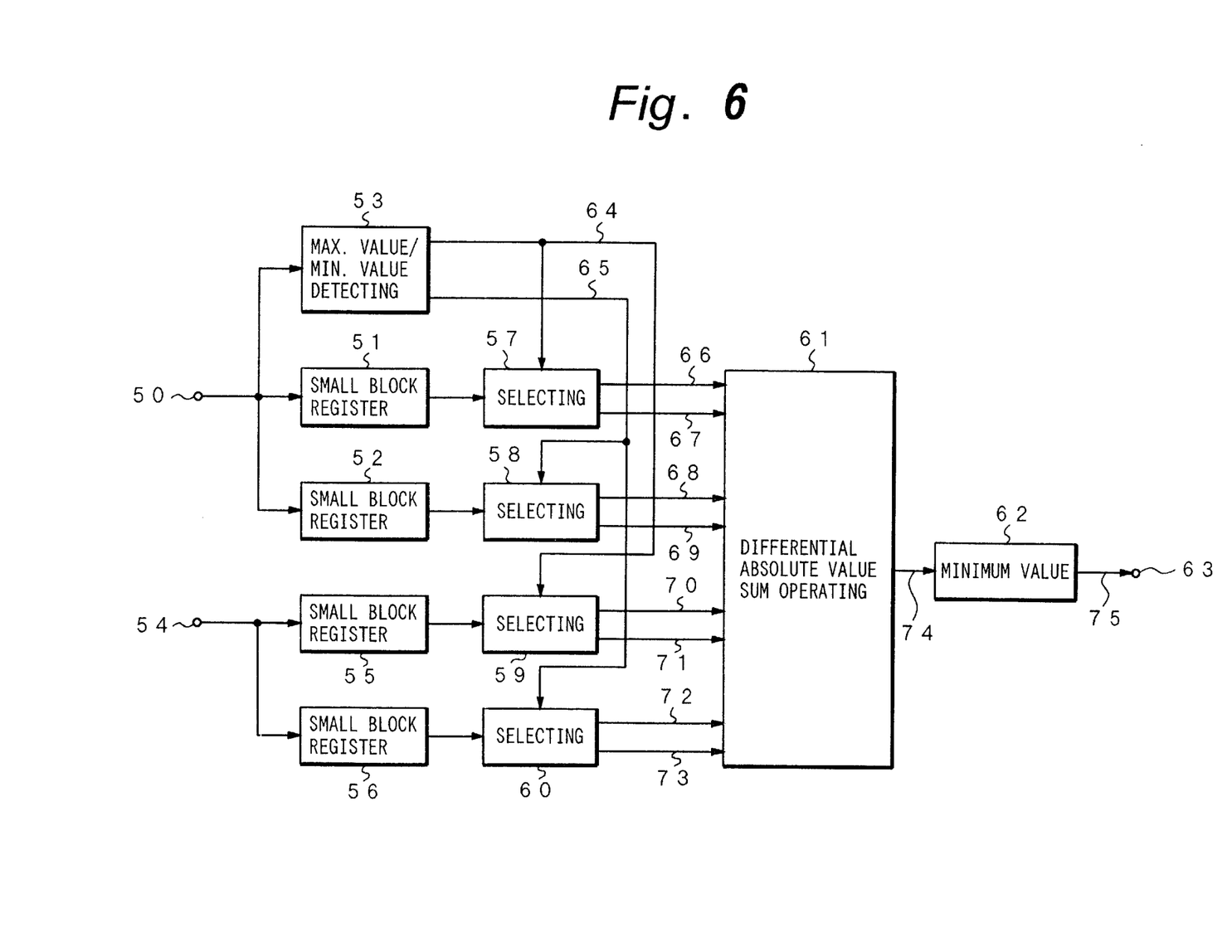
FIG. 6 is a block diagram of the adaptive motion vector detecting apparatus according to the second embodiment.

FIG. 6 is a block diagram of a circuit embodying the second embodiment described above. The reference block is supplied to the input 50 and the check block is supplied to the input 54. The reference block is divided into two small blocks (i.e., sub blocks) and stored in small block registers 51 and 52. Similarly, the check block is divide into two small blocks and stored in small block registers 5S and 56. With reference to FIGS. 4A to 4C, the reference small block 41 is, for example, stored in small block register 51 and the reference small block 42 is stored in the small block register 52; the check small blocks 44 or 47 are stored in the small block register 55 and the check small blocks 45 or 48 are stored in the small block register 56.

The reference block is also sent to a max. value/min. value detecting circuit 53 which selects the maximum and minimum pixel values for each of the small blocks. The max. value/min. value detecting circuit determines positions of the maximum and minimum pixel values in each of the reference small blocks and outputs two selection signals, one for each small block. The first small block 40 of the reference block is sampled by a selecting circuit 57 as determined by selection signed 64 and first small block 44 or 47 of the check block is sampled by a selecting circuit 59 according to the selection signal 64. Similarly, the second small blocks 52 and 56 for both the reference and check blocks are sampled by selecting circuits 58 and 60, respectively, according to the selection signal 65.

The sampled pixel values are, then, forwarded to the differential absolute value sum operating circuit 61 for arithmetic processing. In particular, the maximum pixel values for each small block of the reference block are output on lines 66 and 68 while the minimum pixel values are output on lines 67 and 69. Similarly, the maximum values for each small block of the check block are output on lines 70 and 72 while the minimum values are output on lines 71 and 73. The differential absolute value sum operating circuit 61 derives the residual difference and the minimum value circuit 62 selects the minimum residual difference as the check block is moved within the vector range, as aforedescribed.

The residual difference is calculated in a manner similar to the first embodiment wherein the absolute value of the differences between the maximum values and the absolute value of the differences between the minimum values are added. Recognizing that the maximum and minimum values are the values output on lines 66 to 73 (FIG. 6), the residual difference=|data 66−data 68|+|data 67−data 69|+|data 70−data 72|+|data 71−data 73|.

While the invention of the second embodiment performs adaptive sampling in a manner similar to the first embodiment, the second embodiment offers the advantage of specifying the positions of the pixels having the maximum and minimum values for a plurality of sub blocks in each block, thus yielding a higher degree of accuracy.

The invention according to the second embodiment may also be applied with equally advantageous results to the situation where the reference block is a 16×16 pixel block. As shown in FIGS. 7A and 7B, the reference block is divided into eight 4×8 small blocks. According to the invention, the maximum and minimum values for each of the eight small blocks are determined.

In the situation where there is a large number of pixels in each sub block, there may be more than one maximum or minimum value in each sub block. Preferably, one of each of the maximum and minimum values is selected by selecting the pair of maximum and minimum value pixels which have the greatest distance apart of all pixel pairs. Alternatively, selection is made by choosing the pair of maximum and minimum value pixels which are at a predetermined distance apart. As a further alternative, a pair of pixel positions of the maximum and minimum value pixels are chosen over other pairs which provide a more favorable reference pattern.

It is also advantageous to "flag" each of the maximum and minimum pixel values when the reference block contains a large number of pixel values. FIG. 7B shows the maximum and minimum values of FIG. 7A having flags set to "1" whereas the flags of the other pixel values are set to "0". The "1" flags indicate the positions of the pixels to be selected. Thus, the selection circuits quickly determine the distances between the pixels for selecting one of a plurality of maximum or minimum pixel values.

The sub blocks of FIG. 7A are, then, processed in a manner similar to that described for a 4×4 reference block. Thus, the residual difference is calculated from the sampled pixel values and the minimum residual difference, chosen as the check block is moved within the vector range, is correct. The present invention, thus, may be applied to a reference block of any size by dividing the reference block into sub blocks and calculating the minimum residual difference from the sub blocks. Therefore, the invention has the additional advantage that television broadcasts with even higher density than heretofore seen can be processed.

The present invention, thus, provides adaptive sampling of the pixels employed in the motion vector detecting operation. As noted, particularly with reference to FIG. 5, the signal-to-noise ratio is significantly higher in the present invention than in the fixed sampling method. Therefore, the present invention significantly improves matching the check block to the reference block and an erroneous match is avoided.

While the above invention was described with reference to an MPEG system, it will be appreciated that the present invention is applicable to other applications which employ motion vectors. It is, therefore, to be understood that, within the scope of the appended claims, the invention may be practiced otherwise than as precisely described herein.

I claim:

1. An adaptive motion vector detecting apparatus for adaptively selecting pixels employed to detect motion vectors between a first video frame and a second video frame, said first video frame including a reference block of pixels comprised of all of the pixels in an M×N block of said first video frame and said second video frame including a check block of pixels, comprising:
   analyzing means for adaptively determining positions of a first subset of pixels in said reference block from a variable feature of said reference block; and
   selecting means for sampling said first subset of pixels in said reference block and a second subset of pixels in said check block at said positions determined by said analyzing means.

2. The adaptive motion vector detecting apparatus according to claim 1, further comprising processing means for calculating an absolute value of a motion vector between said reference block and said check block from the first and second subset of pixels.

3. The adaptive motion vector detecting apparatus according to claim 2, further comprising minimum value selecting means for selecting a minimum absolute value of said motion vector for determining a match between said reference block and said check block.

4. The adaptive motion vector detecting apparatus according to claim 1, wherein the variable feature is the maximum and minimum values of the pixels in the reference block.

5. The adaptive motion vector detecting apparatus according to claim 1, wherein the variable feature is the maximum and minimum differences between the values of said pixels in said reference block and a mean value of said pixels in said reference block.

6. The adaptive motion vector detecting apparatus according to claim 1, wherein the variable feature is both the maximum and minimum values of the pixels in the reference block, and the maximum and minimum differences between the values of said pixels in said reference block and a mean value of said pixels in said reference block.

7. The adaptive motion vector detecting apparatus according to claim 1, wherein the variable feature is the maximum and minimum difference between the values of adjacent pixels in said reference block.

8. The adaptive motion vector detecting apparatus according to claim 1, further comprising register means for storing said reference and check blocks to be read out to said selecting means.

9. The adaptive motion vector detecting apparatus according to claim 1, further comprising feature extracting means for extracting pixel values from said reference and check blocks having an extraction feature and transmitting the same to said analyzing and selecting means wherein remaining pixels are discarded and said reference and check blocks are compressed.

10. The adaptive motion vector detecting apparatus according to claim 9, wherein said feature extracting means is a low pass filter for filtering pixels as a function of their intensity.

11. The adaptive motion vector detecting apparatus according to claim 9, wherein said feature extracting means divides said reference and check blocks into smaller blocks and adds the values of the pixels within each said smaller block.

12. The adaptive motion vector detecting apparatus according to claim 9, wherein said feature extracting means performs an integration projection in lateral and vertical directions of said reference and check blocks, respectively.

13. An adaptive motion vector detecting apparatus to detect motion vectors between a first video frame and a second video frame, said first video frame including a reference block of pixels comprised of all of the pixels in an M×N block of said first video frame and said second video frame including a check block of pixels, comprising:
   dividing means for dividing said reference and said check blocks into sets of sub reference blocks and sub check blocks;
   analyzing means for adaptively determining a set of positions of a first subset of pixels for each sub reference block as a function of a variable feature in each sub reference block; and
   selecting means for sampling pixels in a respective sub reference block and pixels in one of said sub check blocks at said set of positions determined for said respective sub reference block.

14. An adaptive motion vector detecting apparatus according to claim 13 wherein said dividing means includes small block registers for storing said sub reference and sub check blocks of pixels.

15. An adaptive motion vector detecting apparatus according to claim 14 wherein said analyzing means includes maximum/minimum value detecting means for determining maximum and minimum values of pixels in each said sub reference block and generating selection signals in response thereto to indicate said set of positions for each sub reference block.

16. An adaptive motion vector detecting apparatus according to claim 15 wherein said selecting means samples pixels in each of said sub reference block and said sub check block as a function of said selection signals.

17. The adaptive motion vector detecting apparatus according to claim 16, further comprising processing means for calculating an absolute value of a motion vector between said reference block and said check block from the values of the pixels selected by said selecting means.

18. The adaptive motion vector detecting apparatus according to claim 17, further comprising minimum value selecting means for selecting a minimum absolute value of said motion vector for determining a match between said reference block and said check block.

19. An adaptive motion vector detecting method for adaptively selecting pixels employed in detecting motion vectors between a first video frame and a second video frame, said first video frame including a reference block of pixels comprised of all of the pixels in an M×N block of said first video frame and said second video frame including a check block of pixels, comprising the steps of:
   adaptively determining positions of a first subset of pixels in said reference block from a variable feature of said reference block; and
   sampling said first subset of pixels in said reference block and a second subset of pixels in said check block at said determined positions.

20. The adaptive motion vector detecting method according to claim 19, further comprising the step of calculating an absolute value of a motion vector between said reference block and said check block from the first and second subset of pixels.

21. The adaptive motion vector detecting method according to claim 20, further comprising the step of selecting a minimum absolute value of said motion vector for determining a match between said reference block and said check block.

22. The adaptive motion vector detecting method according to claim 19, wherein the variable feature is the maximum and minimum values of the pixels in the reference block.

23. The adaptive motion vector detecting method according to claim 19, wherein the variable feature is the maximum and minimum differences between the values of said pixels said reference block and a mean value of said pixels in said reference block.

24. The adaptive motion vector detecting method according to claim 19, wherein the variable feature is both the maximum and minimum values of the pixels in the reference block, and the maximum and minimum differences between the values of said pixels in said reference block and a mean value of said pixels in said reference block.

25. The adaptive motion vector detecting method according to claim 19, wherein the variable feature is the maximum and minimum difference between the values of adjacent pixels in said reference block.

26. The adaptive motion vector detecting method according to claim 19, further comprising the step of storing said reference and check blocks to be read out for sampling.

27. The adaptive motion vector detecting method according to claim 19, further comprising the step of extracting pixel values from said reference and check blocks having an extraction feature and transmitting the same to the analyzing and selecting means, wherein remaining pixels are discarded and said reference and check blocks are compressed.

28. The adaptive motion vector detecting method according to claim 27, wherein said step of extracting comprises low pass filtering pixels as a function of their intensity.

29. The adaptive motion vector detecting method according to claim 27, wherein said step of extracting divides said reference and check blocks into smaller blocks and adds the values of the pixels within each said smaller block.

30. The adaptive motion vector detecting method according to claim 27, wherein said extracted pixel values are obtained by integration projection of the pixels in lateral and vertical directions of said reference and check blocks, respectively.

31. An adaptive motion vector detecting method for detecting motion vectors between a first video frame and a second video frame, said first video frame including a reference block of pixels comprised of all of the pixels in an M×N block of said first video frame and said second video frame including a check block of pixels, comprising the steps of:
   dividing said reference and said check blocks into sets of sub reference blocks and sub check blocks;
   adaptively determining a set of positions of a first subset of pixels for each sub reference block as a function of a variable feature in each sub reference block; and
   sampling pixels in a respective sub reference block and pixels in one of said sub check blocks at said set of positions determined for said respective sub reference block.

32. An adaptive motion vector detecting method according to claim 31 wherein said step of dividing includes the step of storing said sub reference and sub check blocks of pixels.

33. An adaptive motion vector detecting method according to claim 32 wherein said step of determining includes the steps of determining maximum and minimum values of pixels in each said sub reference block and generating selection signals in response thereto to indicate said set of positions for each sub reference block.

34. An adaptive motion vector detecting method according to claim 33 wherein said pixels in each of said sub reference and sub check blocks are sampled as a function of said selection signals.

35. The adaptive motion vector detecting method according to claim 34, further comprising the step of calculating an absolute value of a motion vector between said reference block and said check block from the values of the sampled pixels.

36. The adaptive motion vector detecting method according to claim 35, further comprising the step of selecting a minimum absolute value of said motion vector for determining a match between said reference block and said check block.

\* \* \* \* \*